United States Patent
Pechanec et al.

(10) Patent No.: US 10,185,644 B2
(45) Date of Patent: *Jan. 22, 2019

(54) SERVICE IMPLEMENTATION BASED DEBUGGER FOR SERVICE ORIENTED ARCHITECTURE PROJECTS

(71) Applicant: Red Hat, Inc., Raleigh, NC (US)

(72) Inventors: Jiri Pechanec, Mokra-Horakov (CZ); Martin Vecera, Brno (CZ)

(73) Assignee: Red Hat, Inc., Raleigh, NC (US)

(*) Notice: Subject to any disclaimer, the term of this patent is extended or adjusted under 35 U.S.C. 154(b) by 81 days.

This patent is subject to a terminal disclaimer.

(21) Appl. No.: 15/403,521

(22) Filed: Jan. 11, 2017

(65) Prior Publication Data
US 2017/0123958 A1  May 4, 2017

Related U.S. Application Data

(63) Continuation of application No. 14/631,212, filed on Feb. 25, 2015, now Pat. No. 9,575,869.

(51) Int. Cl.
G06F 11/00 (2006.01)
G06F 11/36 (2006.01)
G06F 9/455 (2018.01)

(52) U.S. Cl.
CPC ...... G06F 11/3636 (2013.01); G06F 11/3624 (2013.01); G06F 9/45504 (2013.01)

(58) Field of Classification Search
CPC .............. G06F 11/36–11/3696; G06F 9/45504
See application file for complete search history.

(56) References Cited

U.S. PATENT DOCUMENTS

| | | | |
|---|---|---|---|
| 5,819,093 A | 10/1998 | Davidson et al. |
| 6,353,923 B1 | 3/2002 | Bogle et al. |
| 7,107,578 B1 | 9/2006 | Alpern |
| 7,478,366 B2 | 1/2009 | Bickson et al. |

(Continued)

OTHER PUBLICATIONS

Vrany et al., "Multilanguage Debugger Architecture", Department of Computer Science and Engineering; Czech Technical University in Prague; Faculty of Electrical Engineering (12 pages).

(Continued)

*Primary Examiner* — Jason B Bryan
(74) *Attorney, Agent, or Firm* — K&L Gates LLP (57) ABSTRACT

A meta-debugger receives a first debugging command from a debugger client to set a breakpoint in a first service in a first language and sets the breakpoint in a first native debugger. After receiving a service message invoking the first service, the breakpoint is triggered and the meta-debugger provides to the debugger client a first graphical representation of the first native debugger. The meta-debugger receives a second debugging command from the debugger client, converts the second debugging command into a third debugging command to provide to the first native debugger. After invoking a second service in a second language, the meta-debugger provides to the debugger client a second graphical representation of the second native debugger. The meta-debugger receives a fourth debugging command from the debugger client, converts the fourth debugging command into a fifth debugging command to provide to the second native debugger.

20 Claims, 6 Drawing Sheets

(56) References Cited

U.S. PATENT DOCUMENTS

| | | |
|---|---|---|
| 8,196,109 B2 | 6/2012 | Fung et al. |
| 8,402,442 B1 * | 3/2013 | Chan ................... G06F 11/3664 |
| | | 714/25 |
| 8,739,129 B1 | 5/2014 | Mosterman et al. |
| 8,793,666 B2 | 7/2014 | Klinker et al. |
| 2005/0034104 A1 | 2/2005 | Pugh et al. |
| 2009/0019430 A1 | 1/2009 | Jaeger et al. |
| 2014/0215443 A1 | 7/2014 | Voccio et al. |

OTHER PUBLICATIONS

Cunha et al., "An Experiment in Tool Integration: the DDBG Parallel and Distributed Debugger", Universidade Nova de Lisboa, Portugal; Dec. 9, 1997 (15 pages).

Lourenco et al., "Fiddle: a Flexible Distributed Debugging Architecture" Departamento de Informatica; Univeridade Nova de Lisboa, Portugal (10 pages).

* cited by examiner

SERVICE IMPLEMENTATION BASED DEBUGGER FOR SERVICE ORIENTED ARCHITECTURE PROJECTS

CROSS REFERENCE TO RELATED APPLICATIONS

The present application is a continuation of and claims priority to and the benefit of U.S. application Ser. No. 14/631,212, filed Feb. 25, 2015, the entire content of which is hereby incorporated by reference herein.

BACKGROUND

A service oriented architecture (SOA) platform facilitates the large scale deployment of services and applications in a distributed environment. As the complexity of these services and applications grow, it has become increasingly important to provide effective means of troubleshooting problems that arise in the design of the SOA platform or the services and/or applications.

Debugging in a non-deterministic system further adds to the difficulty of troubleshooting problems. In a deterministic system, given a set of input messages, the same output will always be produced. In this manner, a fault can be recreated by applying the same set of inputs that caused the fault in the first place. However, in a non-deterministic system (e.g., one that uses non-deterministic components such as multi-language services), the same input may produce many different states or outputs. Recreating and troubleshooting faults becomes significantly more problematic.

SUMMARY

The present disclosure provides a new and innovative system, methods and apparatus for a service implementation based debugger for service oriented architecture projects.

The system includes a memory, one or more processors, in communication with the memory, a client executing on the one or more processors, and a meta-debugger including a user interface module, a native debugger interface module, a debugger engine, a first native debugger, and a second native debugger. The meta-debugger receives a first debugging command from a debugger client to set a breakpoint in a first service including first code written in a first language. The meta-debugger then sets the breakpoint in the first native debugger. After receiving a service message invoking the first service, the breakpoint is triggered and the meta-debugger provides to the debugger client a first graphical representation of the first native debugger in the first language. The meta-debugger receives a second debugging command from the debugger client, converts the second debugging command into a third debugging command that is compatible with the first native debugger, and provides the third debugging command to the first native debugger. After invoking a second service including second code written in a second language, the meta-debugger provides to the debugger client a second graphical representation of the second native debugger in the second language. The meta-debugger receives a fourth debugging command from the debugger client, converts the fourth debugging command into a fifth debugging command that is compatible with the second native debugger, and provides the fifth debugging command to the second native debugger.

Additional features and advantages of the disclosed method and apparatus are described in, and will be apparent from, the following Detailed Description and the Figures.

DETAILED DESCRIPTION OF EXAMPLE EMBODIMENTS

Figure 1:
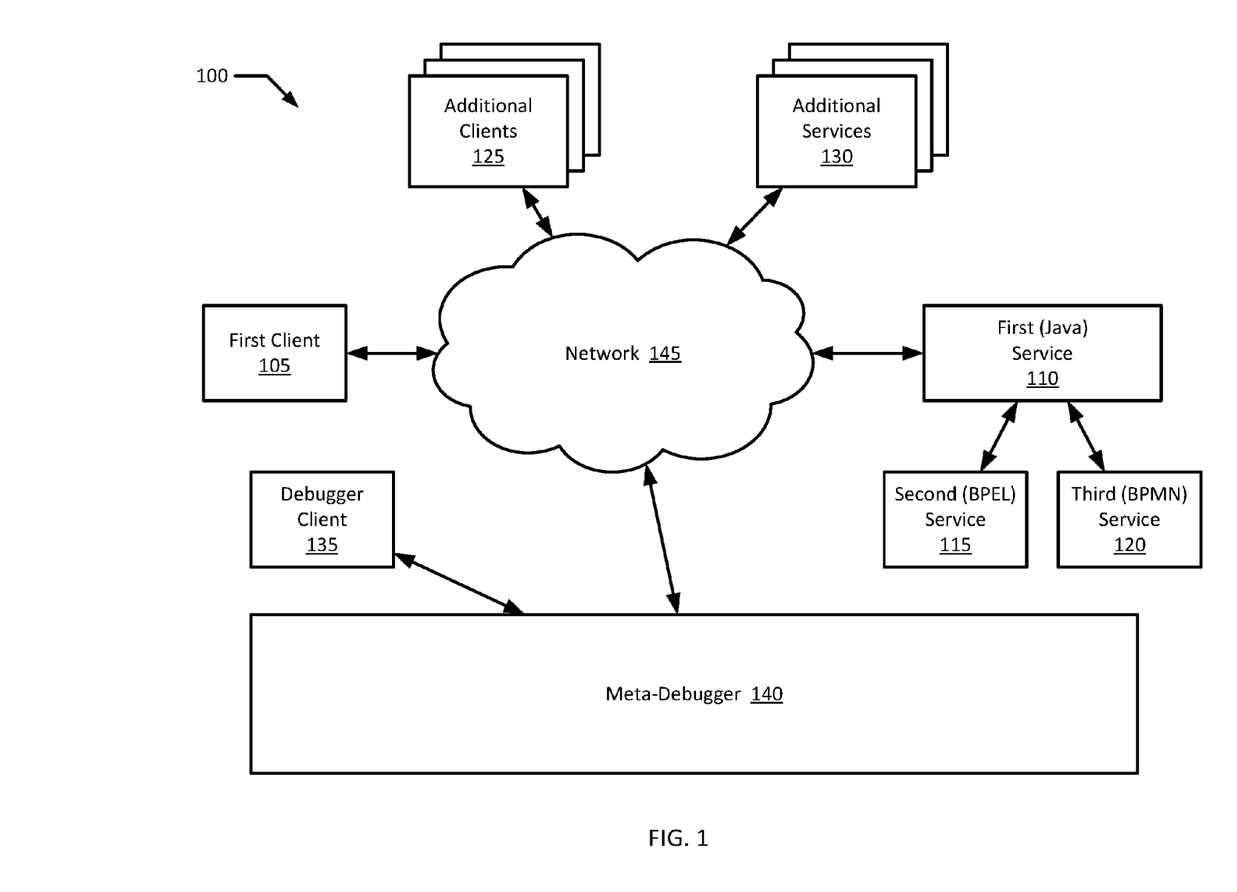
FIG. 1 is a block diagram of an example service oriented architecture system according to an example embodiment of the present disclosure.

FIG. 1 depicts a block diagram of an example service oriented architecture system according to an example embodiment of the present disclosure. Distributed computer system 100 includes a service oriented architecture (SOA) platform. In an example embodiment, the service oriented architecture (SOA) platform includes clients (e.g., first client 105 and/or additional clients 125) and services (e.g., first service 110, second service 115, third service 120, and/or additional services 130). For example, the SOA platform organizes the distributed services (e.g., first service 110, second service 115, third service 120, and/or additional services 130) and facilitates interaction among clients (e.g., first client 105 and/or additional clients 125) and services (e.g., first service 110, second service 115, third service 120, and/or additional services 130). Moreover, the SOA platform may be designed to combine multiple services (e.g., first service 110, second service 115, third service 120, and/or additional services 130) and provide interoperability between different services (e.g., first service 110, second service 115, third service 120, and/or additional services 130).

In an example embodiment, the clients (e.g., first client 105 and/or additional clients 125) and services (e.g., first service 110, second service 115, third service 120, and/or additional services 130) may communicate via a network 145. For example, the network 145 may be a public network (e.g., the Internet), a private network (e.g., a local area network (LAN) or wide area network (WAN)), or a combination thereof. In an example embodiment, the network 145 may also include an enterprise service bus (ESB) which provides an infrastructure linking together heterogeneous clients (e.g., first client 105 and/or additional clients 125) and services (e.g., first service 110, second service 115, third service 120, and/or additional services 130). For example, the ESB may translate transmitted messages to an appropriate protocol prior to delivering the messages.

In an example embodiment, a service (e.g., first service 110, second service 115, third service 120, and/or additional services 130) may be any process, activity, task, application, or resource that may be accessed and used by other clients (e.g., first client 105 and/or additional clients 125) or services (e.g., first service 110, second service 115, third service 120, and/or additional services 130) via the network 145. Each service (e.g., first service 110, second service 115, third service 120, and/or additional services 130) may operate independently of other services (e.g., first service 110, second service 115, third service 120, and/or additional services 130) or in combination with other services. For example, a first service 110 may delegate tasks to a second service 115 and a third service 120. In an example embodiment, services (e.g., first service 110, second service 115, third service 120, and/or additional services 130) in the distributed computer system 100 may be heterogeneous and operate using different programming languages and communicate using different communication protocols. In an example embodiment, a service (e.g., first service 110, second service 115, third service 120, and/or additional services 130) may be written in Java, C, C++, C-sharp, Visual Basic, structured query language (SQL), Pascal, common business oriented language (COBOL), business process execution language (BPEL), business process model notation (BPMN), complex event processing (CEP), jBPM, Drools, etc. For example, a first service 110 may be a Java service, a second service 115 may be a BPEL service, and a third service 120 may be a BPMN service.

In an example embodiment, a first client 105 may generate and send a message via network 145 to a first (Java) service 110. In an example embodiment, a message may include data that conveys information to the first service 110, invokes the first service 110, and/or initiates an event on the first service 110. In an example embodiment, a service (e.g., first service 110, second service 115, third service 120, and/or additional services 130) may generate and send a message to another service (e.g., first service 110, second service 115, third service 120, and/or additional services 130). For example, first (Java) service 110 may generate and send a message to one or more additional services 130. In an example embodiment, a message may include a message identifier, routing information (e.g., to route the message to an end point), security information (e.g., authentication and authorization information), custom fields, etc. A message may also include a request, information required by the destination service 110, and or information to which the destination service 110 must respond. In an example embodiment, a service 110 may perform a business function such as creating an order, fulfilling an order, shipping an order, invoicing an order, cancelling an order, updating an order, etc. In an example embodiment, a message may invoke a service 110 to perform one of these business functions.

In an example embodiment, the distributed computer system 100 includes a meta-debugger 140 and a debugger client 135 to debug services (e.g., first service 110, second service 115, third service 120, and/or additional services 130) on the distributed computer system 100. In an example embodiment, communications among the clients (e.g., first client 105 and/or additional clients 125) and services (e.g., first service 110, second service 115, third service 120, and/or additional services 130) as well as execution data and states of the services (e.g., first service 110, second service 115, third service 120, and/or additional services 130) may be routed through the meta-debugger 140. The debugger client 135 and the meta-debugger 140 are described in greater detail below and with reference to FIG. 2.

In an example embodiment, the components on distributed computer system 100 may operate on one or more physical processors communicatively coupled to memory devices and input/output devices. For example, a client (e.g., first client 105 and/or additional clients 125) may be a personal computing device, server, etc. In another example embodiment, a client (e.g., first client 105 and/or additional clients 125) may be a virtual machine or application executing on a personal computing device, server, the one or more physical processors, etc.

As used herein, a physical processor or processor refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device or memory refers to a volatile or non-volatile memory device, such as RAM, ROM, EEPROM, or any other device capable of storing data. As discussed herein, I/O device refers to a device capable of providing an interface between one or more processor pins and an external device capable of inputting and/or outputting binary data.

Figure 2:
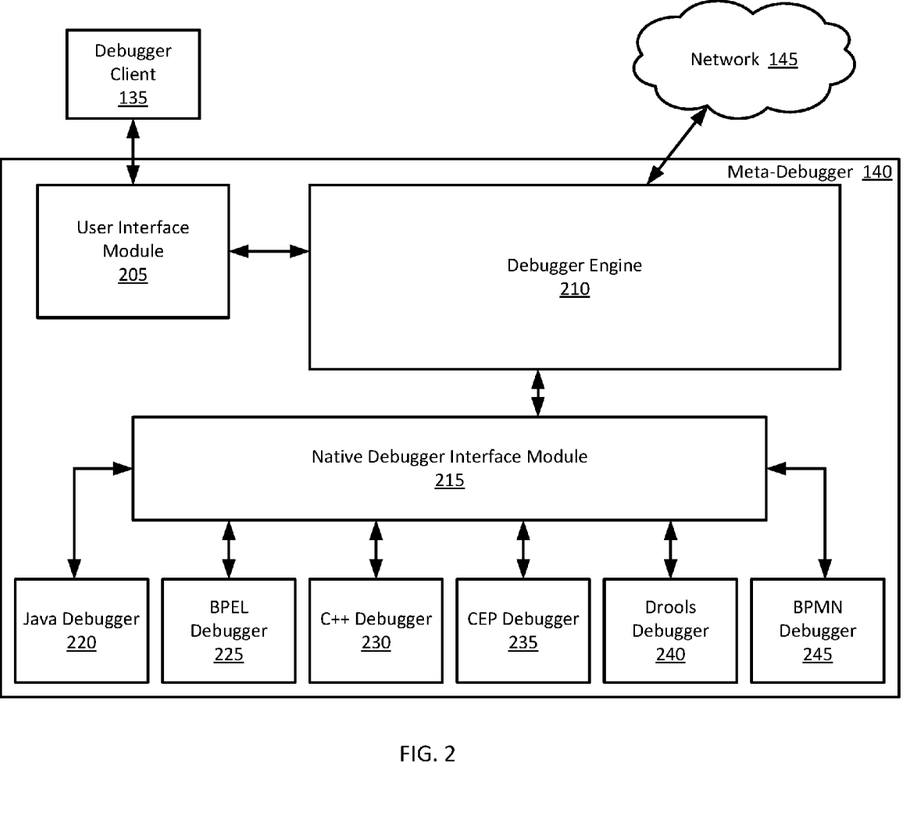
FIG. 2 is a block diagram of an example meta-debugger according to an example embodiment of the present disclosure.

FIG. 2 depicts a block diagram of an example meta-debugger 140 according to an example embodiment of the present disclosure. In an example embodiment, the meta-debugger 140 is provided for debugging multiple services (e.g., first service 110, second service 115, third service 120, and/or additional services 130) written in several different programming languages.

In the illustrated example embodiment, a meta-debugger 140 includes a user interface module 205 for interfacing with a debugger client 135, a debugger engine 210, a native debugger interface module 215, and one or more native debuggers (e.g., Java debugger 220, BPEL debugger 225, C++ debugger 230, CEP debugger 235, Drools debugger 240, and/or BPMN debugger 245). In an example embodiment, the meta-debugger may also include a C debugger, C-sharp debugger, a jBPM debugger, a Visual Basic debugger, a SQL debugger, a Pascal debugger, a COBOL debugger, and/or any other native debugger. As referenced herein, a native debugger is any debugging tool that supports the debugging of a particular set of programming languages (e.g. Java).

In an example embodiment, the user interface module 205 of the meta-debugger 140 is configured to provide a set of meta-debugger debugging commands to a user via the debugger client 135. For example, a meta-debugger debugging command may include setting a breakpoint, clearing a breakpoint, stepping over, stepping into, stepping out, running, stopping, getting a variable, getting a source, evaluating an expression, showing stack frame information, etc. In an example embodiment, the meta-debugger debugging commands may be universal debugging commands that may be converted by the native debugger interface module 215 into one or more debugging commands that are compatible with a native debugger (e.g., Java debugger 220). This example aspect is described in greater detail below.

In an example embodiment, a user can use the debugger client 135 to issue debugging commands to the meta-debugger 140 and receive debugging information via an interface on the debugger client 135 that is provided by the user interface module 205. In an example embodiment, debugging information may include contents of memory locations at a particular stage of execution, a call stack of routines that have been invoked but not yet ended at the particular stage of execution, lists of objects associated with the routines, tracing information describing which instructions are being executed, time profile information describing the execution time of one or more instructions, and any other information that a user may utilize to troubleshoot the performance of one or more services (e.g., first service 110, second service 115, third service 120, and/or additional services 130). For example, the debugger client 135 may present a graphical user interface (GUI) received from the user interface module 205 including information about high-level language statements, contents of memory when the high-level language statements are executed, available meta-debugger debugging commands, etc.

In an example embodiment, the debugger engine 210 receives meta-debugger debugging commands from the debugger client 135 via the user interface module 205. In an example embodiment, the debugger engine 210 may pass a meta-debugger debugging command directly to the native debugger interface module 215 without modifying the meta-debugger debugging command. The native debugger interface module 215 may then convert the meta-debugger debugging command into a debugging command that is compatible with a native debugger (e.g., Java debugger 220).

In an example embodiment, the debugger engine 210 may receive debugging information from a native debugger (e.g., Java debugger 220) in its unmodified native format via the native debugger interface module 215. The debugger engine 210 may then pass the debugging information directly to the debugger client 135 via the user interface module 205 without modifying the debugging information. In this manner, the meta-debugger 140 allows a user to debug (via a debugger client 135) multiple services written in several different languages without converting, translating, interpreting or otherwise mapping debugging information in one language into debugging information in a different language.

In an example embodiment, communications among the clients (e.g. first client 105 and/or additional clients 125) and services (e.g., first service 110, second service 115, third service 120, and/or additional services 130) as well as execution data and states of the services (e.g., first service 110, second service 115, third service 120, and/or additional services 130) may be routed through the debugger engine 210 of the meta-debugger 140 via network 145. In an example embodiment, the debugger engine holds the state of running services (e.g., first service 110, second service 115, third service 120, and/or additional services 130) including the running threads, the stack frame information, and breakpoints set in the services routines). Accordingly, in an example embodiment, the debugger engine 210 may determine the location of a breakpoint in the code of a service (e.g., first service 110, second service 115, third service 120, and/or additional services 130) and trigger the breakpoint when it is hit.

In an example embodiment, the user interface module 205, the debugger engine 210, and/or the native debugger interface module 215 may be combined into one module. In an example embodiment, the user interface module 205, the debugger engine 210, and/or the native debugger interface module 215 may each be divided into additional separate modules. In an example embodiment, above described aspects of each of the user interface module 205, the debugger engine 210, and/or the native debugger interface module 215 may be performed by a different module. For example, in place of the native debugger interface module 215, the debugger engine 210 may convert meta-debugger debugging commands into debugging commands compatible with a native debugger (e.g., Java debugger 220).

Figure 3:
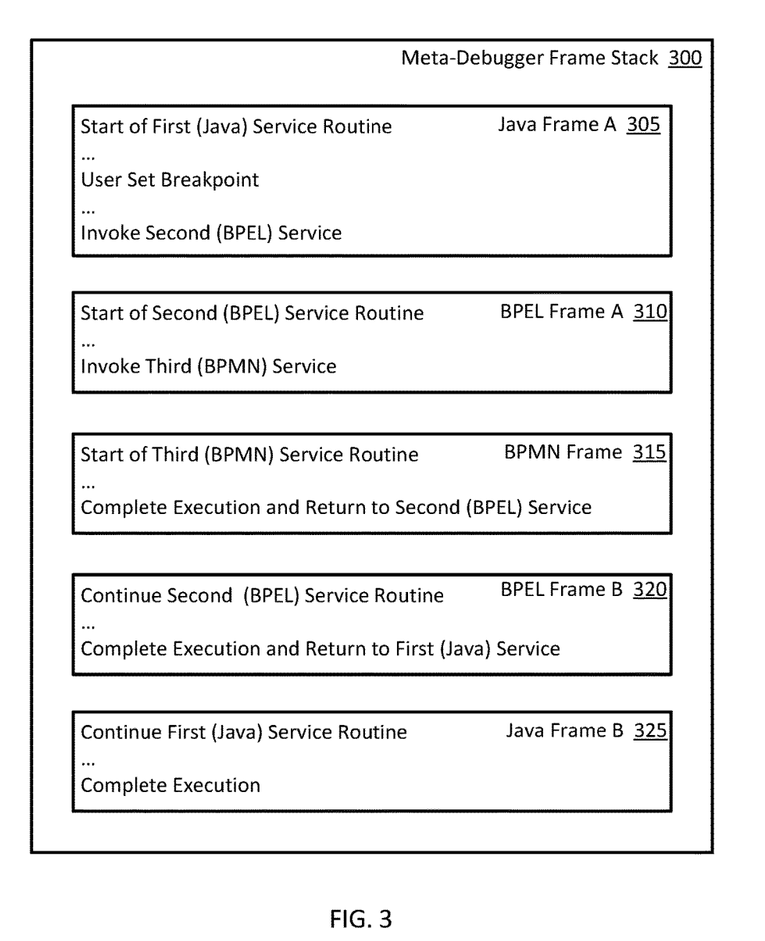
FIG. 3 is a block diagram of an example meta-debugger frame stack according to an example embodiment of the present disclosure.

FIG. 3 depicts a block diagram of an example meta-debugger frame stack 300 according to an example embodiment of the present disclosure. In an example embodiment, the meta-debugger frame stack 300 illustrates the graphical user interface (GUI) presented to a user via the debugger client 135. As used herein, a frame (e.g., Java Frame A 305) generally represents routines that have not yet returned or completed execution. In the illustrated example embodiment, the frames (e.g., Java Frame A 305, BPEL Frame A 310, BPMN Frame 315, BPEL Frame B 320, and Java Frame B 325) may be positioned in the frame stack 300 in order of execution. The meta-debugger 140 may add a frame (e.g., Java Frame A 305) when the corresponding routine of the service (e.g., first (Java) service 110) is invoked. The meta-debugger 140 may remove a frame (e.g., Java Frame A 305 when the corresponding routine of the service (e.g., first (Java) service 110) completes execution and/or returns. In an example embodiment, a frame may include additional debugging information not shown in the illustrated example embodiment in FIG. 3, including contents of memory locations at a particular stage of execution, a call stack of routines that have been invoked but not yet ended at the particular stage of execution, lists of objects associated with the routines, tracing information describing which instructions are being executed, time profile information describing the execution time of one or more instructions, etc.

In the illustrated example embodiment, the code of a first service 110 that is being debugged may be written in Java. The meta-debugger 140 may use the user interface module 205 to present a Java debugger GUI using information received from the native Java debugger 220. In an example embodiment, this information may be presented in a Java frame (e.g., Java Frame A 305). The Java frame (e.g., Java Frame A 305) may include a sequence of one or more statements or instructions written in Java that define the first (Java) service 110 routine. As used herein, a routine may be referenced as a program, a function, a procedure, a subroutine, code, or any other commonly used equivalent. In an example embodiment, via the debugger client 135, a user may set a breakpoint in the code of the first (Java) service 110 using a meta-debugger debugging command. In an example embodiment, the meta-debugger 140 converts the meta-debugger debugging command into a debugging command that is compatible with the Java debugger 220. As used herein, a breakpoint identifies a location within the program at which execution should halt. Halting a program at a breakpoint may give a user the opportunity to inspect the debugging information at that particular point of execution.

In the illustrated example embodiment, the user may issue meta-debugger debugging commands to step through the instructions of the first (Java) service 110 routine. The first (Java) service 110 may invoke a second (BPEL) service 115. The meta-debugger 140 may then present a BPEL debugger GUI in a BPEL frame (e.g., BPEL frame A 310) to the user using debugging information from the BPEL debugger 225. The second (BPEL) service 115 may invoke a third (BPMN) service 120 and the meta-debugger 140 may then present a BPMN debugger GUI in a BPMN frame (e.g., BPMN Frame 315) to the user using debugging information from the BPEL debugger 225. Responsive to completing execution of the BPMN service routine and/or returning to the second (BPEL) service 115, the meta-debugger 140 may present the BPEL debugger GUI once again in a BPEL frame (e.g., BPEL Frame B 320). Then, responsive to completing execution of the BPEL service routine and/or returning to the first (Java) service 110, the meta-debugger 140 may then present the Java debugger GUI once again in a Java frame (e.g., Java Frame B 325). In this manner, the meta-debugger 140 allows a user to debug a multitude of heterogeneous services (e.g., first service 110, second service 115, third service 120, and/or additional services 130) using the most appropriate debugger (e.g., Java debugger 220, BPEL debugger 225, etc.) corresponding to the language of each service (e.g., first service 110, second service 115, third service 120, and/or additional services 130). Moreover, the meta-debugger 140 allows a user to debug the multitude of heterogeneous services (e.g., first service 110, second service 115, third service 120, and/or additional services 130) without changing from high-level language statements in a first language to low-level language statements in a different second language.

Figure 4:
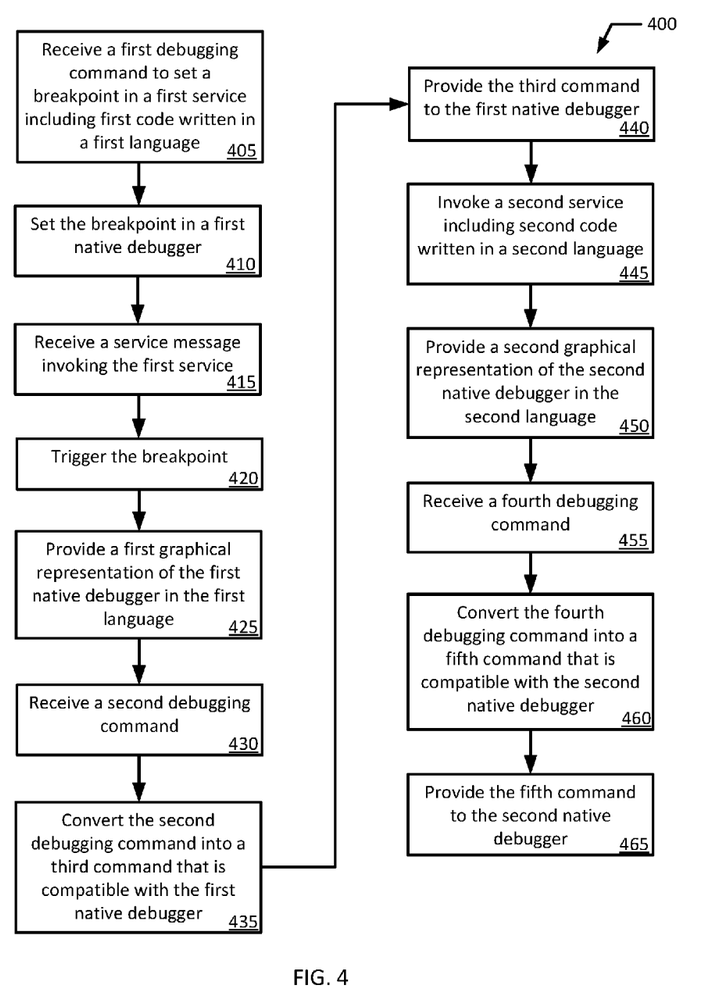
FIG. 4 is a flowchart illustrating an example process for a service implementation based debugger for service oriented architecture projects according to an example embodiment of the present disclosure.

FIG. 4 illustrates a flowchart of an example method 400 for a service implementation based debugger for service oriented architecture projects in accordance with an example embodiment of the present disclosure. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, and some of the blocks described are optional. The method 400 may be performed by processing logic that may comprise hardware (circuitry, dedicated logic, etc.), software, or a combination of both. In an example embodiment, the method is performed by a meta-debugger 140.

The example method 400 starts and the user interface module 205 receives a first debugging command from a debugger client 135 to set a breakpoint in a first service 110 including first code written in a first language (e.g., Java) (block 405). In an example embodiment, the first debugging command is a meta-debugger debugging command. Responsive to receiving the first debugging command, the native debugger interface module 215 sets the breakpoint in a first native debugger (e.g., Java debugger 220) (block 410). In an example embodiment, to set the breakpoint in the first native debugger (e.g., Java debugger 220), the native debugger interface module 215 may first convert the first debugging command into a debugging command that is compatible with the first native debugger (e.g., Java debugger 220).

The meta-debugger 140 then receives from the client a service message invoking the first service 110 (block 415). In an example embodiment, the debugger engine 210 of the meta-debugger 140 receives the service message via a network 145. Responsive to receiving the service message, the debugger engine 210 triggers the breakpoint. In an example embodiment, the debugger engine 210 monitors the execution states of the first service, and responsive to reaching the breakpoint, provides information to the first native debugger (e.g., Java debugger 220) to trigger the breakpoint (block 420). Responsive to triggering the breakpoint, the user interface module 205 provides a first graphical representation of the first native debugger (e.g., Java debugger 220) in the first language (block 425). In an example embodiment, the first graphical representation includes debugging information from the first native debugger (e.g., Java debugger 220) and is in a format that the first native debugger (e.g., Java debugger 220) traditionally presents its information to users.

The user interface module 205 receives a second debugging command from the debugger client 135 (block 430). In an example embodiment, the second debugging command is a meta-debugger debugging command. The native debugger interface module 215 converts the second debugging command into a third debugging command that is compatible with the first native debugger (e.g., Java debugger 220) (block 435). The native debugger interface module 215 provides the third debugging command to the first native debugger (e.g., Java debugger 220) (block 440). The first service 110 then invokes a second service 115 including second code written in a second language (e.g., BPEL) (block 445). Responsive to invoking the second service 115, the user interface module 205 provides a second graphical representation of the second native debugger (e.g., BPEL debugger 225) in the second language (e.g., BPEL) (block 450). In an example embodiment, responsive to invoking the second service 115 in the second language, the debugger engine 210 may provide routine information regarding the second service 115 routine (e.g., code, execution states, contents of memory locations at a particular stage of execution, etc.) to the second native debugger (e.g., BPEL debugger 225). The second native debugger (e.g., BPEL debugger 225) may then return debugging information in a format that the second native debugger (e.g., BPEL debugger 225) traditionally presents its information to users. The user interface module 205 may then provide this debugging information to the user via the debugger client 135.

The example method 400 may continue with the user interface module 205 receiving a fourth debugging command from the debugger client 135 (block 455). In an example embodiment, the fourth debugging command is a meta-debugger debugging command. The native debugger interface module 215 converts the fourth debugging command into a fifth debugging command that is compatible with the second native debugger (e.g., BPEL debugger 225) (block 460). The native debugger interface module 215 provides the fifth debugging command to the second native debugger (e.g., BPEL debugger 225) (block 465).

In an example embodiment, the execution of the second service 115 may complete, and responsive to completing the execution of the second service 115, the second service 115 may return to the first service 110. Responsive to returning to the first service the user interface module 205 may provide the first graphical representation of the first native debugger (e.g., Java debugger 220) in the first language (e.g., Java).

In an example embodiment, the first service may then invoke a third service 120 including third code written in a third language (e.g., BPMN). Responsive to invoking the third service, the user interface module 205 may provide a third graphical representation of a third native debugger (e.g., BPMN debugger 245) in the third language (e.g., BPMN). The user interface module 205 may then receive a sixth debugging command (e.g., a meta-debugger debugging command) from the debugger client 135 and the native debugger interface module 215 may convert the sixth debugging command into a seventh debugging command that is compatible with the third native debugger (e.g., BPMN debugger 245). The native debugger interface module 215 may then provide the seventh debugging command to the third native debugger (e.g., BPMN debugger 245).

Figure 5A:
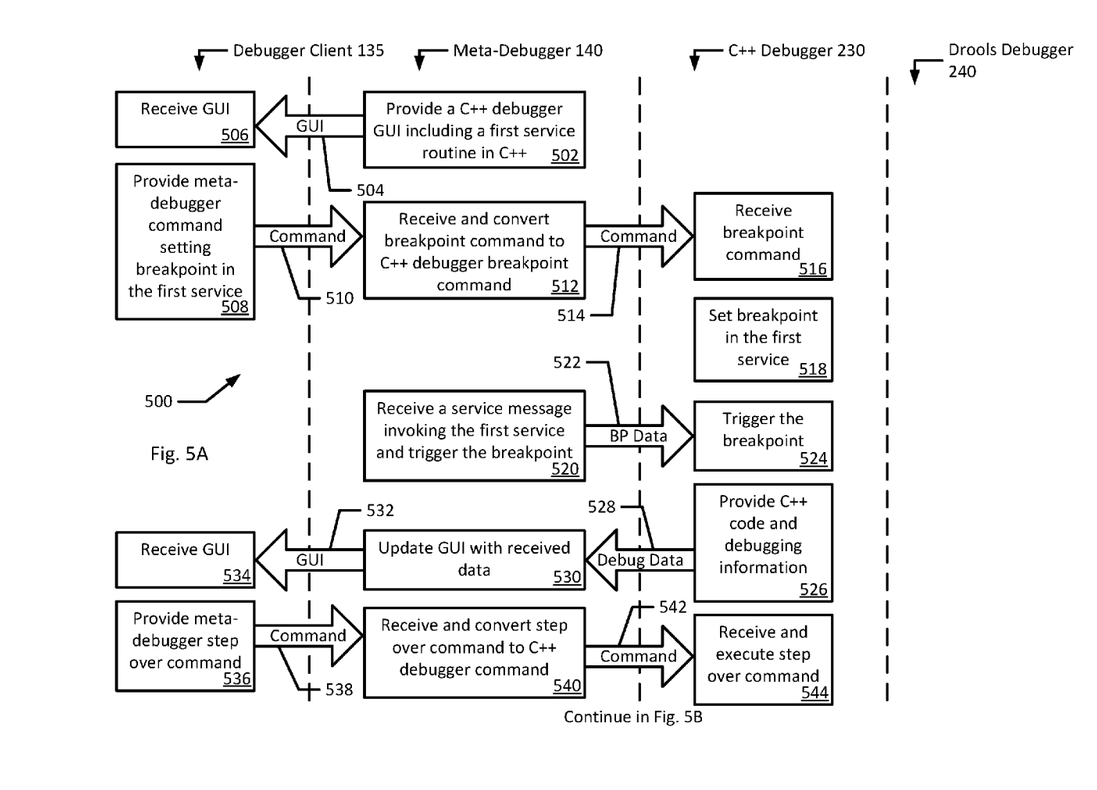
FIG. 5A is a flow diagram illustrating an example process for a service implementation based debugger for service oriented architecture projects according to an example embodiment of the present disclosure.
Figure 5B:
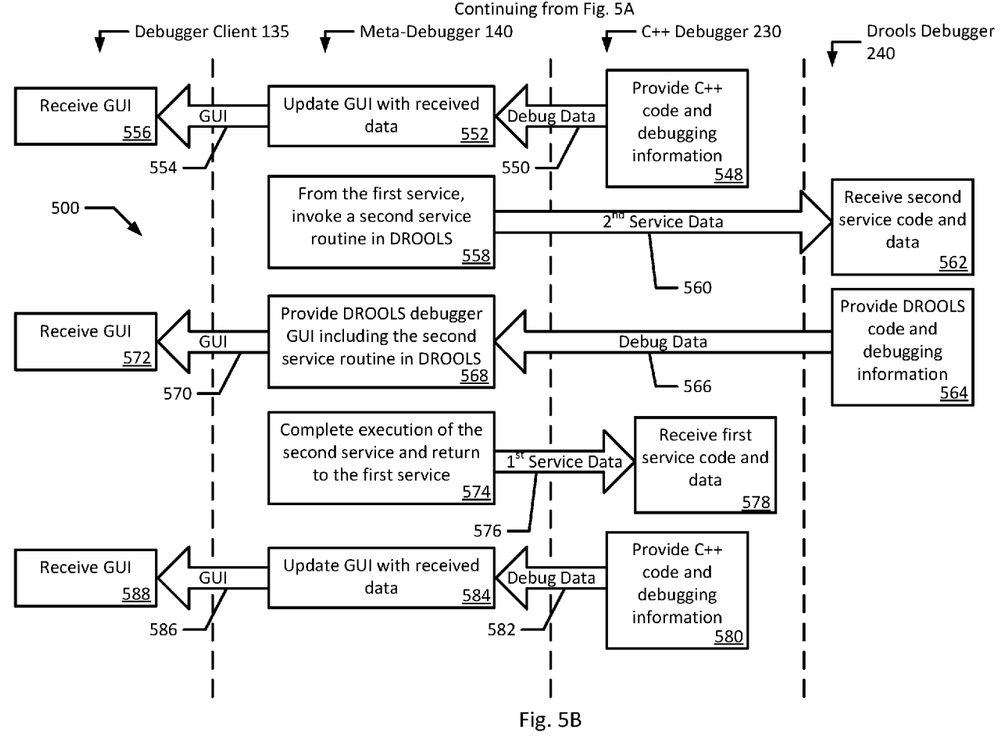
FIG. 5B is a flow diagram continuing the example process illustrated in FIG. 5A.

FIGS. 5A and 5B illustrate a flow diagram of an example method 500 for a service implementation based debugger for service oriented architecture projects in accordance with an example embodiment of the present disclosure. Although the example method 500 is described with reference to the flowchart illustrated in FIGS. 5A and 5B, it will be appreciated that many other methods of performing the acts associated with the method 500 may be used. For example, the order of some of the blocks may be changed, certain blocks may be combined with other blocks, and some of the blocks described are optional. The method 500 may be performed by processing logic that may comprise hardware (circuitry, dedicated logic, etc.), software, or a combination of both.

In the illustrated example embodiment, a meta-debugger 140 provides a C++ debugger graphical user interface (GUI) including debugging information and code of a first service (e.g., first service 110, second service 115, third service 120, and/or additional services 130) routine in C++ (block 502). The debugging information and code of the first service (e.g., first service 110, second service 115, third service 120, and/or additional services 130) routine in C++ is sent to the debugger client 135 (block 504). The debugger client 135 receives the GUI and presents it to a user (block 506). The debugger client 135 provides a meta-debugger debugging command setting a breakpoint in the first service (e.g., first service 110, second service 115, third service 120, and/or additional services 130) (block 508). This command is sent to the meta-debugger 140 (block 510). The meta-debugger 140 receives the meta-debugger breakpoint command and converts it into a breakpoint command compatible with a C++ debugger 230 (block 512). The meta-debugger 140 sends the C++ debugger breakpoint command to the C++ debugger 230 (block 514). The C++ debugger 230 receives the C++ debugger breakpoint command (block 516). The C++ debugger 230 then sets the breakpoint in the code of the first service (e.g., first service 110, second service 115, third service 120, and/or additional services 130) routine (block 518). The meta-debugger may then receive or intercept a service message from a client 105 or another service (e.g., first service 110, second service 115, third service 120, and/or additional services 130) invoking the first service (e.g., first service 110, second service 115, third service 120, and/or additional services 130) and trigger the breakpoint (block 520). The meta-debugger 140 provides information regarding the triggered breakpoint to the C++ debugger 230 (block 522). The C++ debugger 230 then triggers the breakpoint in the C++ code of the first service (e.g., first service 110, second service 115, third service 120, and/or additional services 130) (block 524). The C++ debugger provides debugging information (including high level C++ statements) to the meta-debugger 140 (block 526). This data is sent to the meta-debugger 140 (block 528). The meta-debugger 140 updates the GUI with the received data (block 530). The meta-debugger 140 then provides this GUI to the debugger client 135 (block 532). The debugger client 135 receives the GUI and presents it to a user (block 534). The debugger client 135 provides a meta-debugger step over command to step over one or more high level C++ instructions (block 536). The debugger client 135 sends the meta-debugger step over command to the meta debugger 140 (block 538). The meta-debugger 140 receives the meta-debugger step over command and converts it into a step over command compatible with the C++ debugger 230 (block 540). The meta-debugger 140 sends the C++ debugger step over command to the C++ debugger 230 (block 542). The C++ debugger 230 receives the C++ debugger step over command (block 544).

The flow diagram continues in FIG. 5B. Responsive to receiving the C++ debugger step over command, the C++ debugger 230 provides debugging information (including high level C++ statements) to the meta-debugger 140 (block 548). This data is sent to the meta-debugger 140 (block 550). The meta-debugger 140 updates the GUI with the received data (block 552). The meta-debugger 140 then provides this GUI to the debugger client 135 (block 554). The debugger client 135 receives the GUI and presents it to a user (block 556).

The meta-debugger 140 may then detect or intercept an execution state by the first service (e.g., first service 110, second service 115, third service 120, and/or additional services 130) invoking a second service (e.g., first service 110, second service 115, third service 120, and/or additional services 130) written in Drools (block 558). The meta-debugger 140 provides routine information regarding the second service (e.g., first service 110, second service 115, third service 120, and/or additional services 130) routine (e.g., code, execution states, contents of memory locations at a particular stage of execution, etc.) to the Drools debugger 240 (block 560). The Drools debugger 240 receives this data (block 562). The Drools debugger 240 provides debugging information (including high level Drools statements) to the meta-debugger 140 (block 564). This data is sent to the meta-debugger 140 (block 566). The meta-debugger 140 receives this data and provides a Drools debugger GUI including debugging information and code of the second service (e.g., first service 110, second service 115, third service 120, and/or additional services 130) routine in Drools (block 568). The meta-debugger 140 sends this GUI to the debugger client 135 (block 570). The debugger client 135 receives the GUI and presents it to a user (block 572).

The meta-debugger 140 may then detect or intercept an execution state by the second service (e.g., first service 110, second service 115, third service 120, and/or additional services 130) completing the execution of the second service (e.g., first service 110, second service 115, third service 120, and/or additional services 130) and returning to the first service (e.g., first service 110, second service 115, third service 120, and/or additional services 130) (block 574). The meta-debugger 140 provides routine information regarding the first service (e.g., first service 110, second service 115, third service 120, and/or additional services 130) routine (e.g., code, execution states, contents of memory locations at a particular stage of execution, etc.) to the C++ debugger 230 (block 576). The C++ debugger 230 receives this data (block 578). The C++ debugger 230 provides debugging information (including high level C++ statements) to the meta-debugger 140 (block 580). This data is sent to the meta-debugger 140 (block 582). The meta-debugger 140 updates the GUI with the received data (block 584). The meta-debugger 140 then provides this GUI to the debugger client 135 (block 586). The debugger client 135 receives the GUI and presents it to a user (block 588).

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

Aspects of the subject matter described herein may be useful alone or in combination with one or more other aspects described herein. Without limiting the following description, in a first example aspect of the present disclosure, a system for debugging a first service including first code written in a first language and a second service including second code written in a second language, where the first language and the second language are different, comprises a memory, one or more processors, in communication with the memory, a client executing on the one or more processors, and a meta-debugger including, a user interface module, a native debugger interface module, a debugger engine, a first native debugger, and a second native debugger, where the meta-debugger executes on the one or more processors to receive, by the user interface module, a first debugging command from a debugger client to set a breakpoint in the first service including the first code written in the first language, responsive to receiving the first debugging command, set, by the native debugger interface module, the breakpoint in a first native debugger, receive, from the client, a service message invoking the first service, responsive to receiving the service message, trigger, by the debugger engine, the breakpoint, responsive to triggering the breakpoint, provide, by the user interface module, a first graphical representation of the first native debugger in the first language, receive, by the user interface module, a second debugging command from the debugger client, convert, by the native debugger interface module, the second debugging command into a third debugging command that is compatible with the first native debugger, provide, by the native debugger interface module, the third debugging command to the first native debugger, invoke, by the first service, the second service including the second code written in the second language, responsive to invoking the second service, provide, by the user interface module, a second graphical representation of the second native debugger in the second language, receive, by the user interface module, a fourth debugging command from the debugger client, convert, by the native debugger interface module, the fourth debugging command into a fifth debugging command that is compatible with the second native debugger, and provide, by the native debugger interface module, the fifth debugging command to the second native debugger. In accordance with another example aspect of the present disclosure, which may be used in combination with any one or more of the preceding aspects, the first language is selected from the group consisting of: Java, C, C++, C-sharp, Visual Basic, SQL, Pascal, COBOL, BPEL, BPMN, CEP, jBPM, and Drools. In accordance with another example aspect of the present disclosure, which may be used in combination with any one or more of the preceding aspects, the second language is different from the first language and is selected from the group consisting of: Java, C, C++, C-sharp, Visual Basic, SQL, Pascal, COBOL, BPEL, BPMN, CEP, jBPM, and Drools. In accordance with another example aspect of the present disclosure, which may be used in combination with any one or more of the preceding aspects, the user interface module further provides to the debugger client a set of meta-debugger debugging commands including set a breakpoint, clear a breakpoint, step over, step into, step out, run, stop, get variable, get source, evaluate expression, and show stack frame information. In accordance with another example aspect of the present disclosure, which may be used in combination with any one or more of the preceding aspects, the meta-debugger further executes on the one or more processors to complete, by the meta-debugger, execution of the second service, responsive to completing the execution of the second service, return, by the meta-debugger, to the first service, and responsive to returning to the first service, provide, by the user interface module, the first graphical representation of the first native debugger in the first language. In accordance with another example aspect of the present disclosure, which may be used in combination with any one or more of the preceding aspects, the meta-debugger further executes on the one or more processors to invoke, by the first service, a third service including third code written in a third language, responsive to invoking the third service, provide, by the user interface module, a third graphical representation of a third native debugger in the third language, receive, by the user interface module, a sixth debugging command from the debugger client, convert, by the native debugger interface module, the sixth debugging command into a seventh debugging command that is compatible with the third native debugger, and provide, by the native debugger interface module, the seventh debugging command to the third native debugger. In accordance with another example aspect of the present disclosure, which may be used in combination with any one or more of the preceding aspects, the first and second services are service oriented architecture services.

In a second example aspect of the present disclosure, a method for debugging a first service including first code written in a first language and a second service including second code written in a second language, where the first language and the second language are different, comprises receiving, by a user interface module of a meta-debugger executing on a computer system, a first debugging command from a debugger client to set a breakpoint in the first service including the first code written in the first language, responsive to receiving the first debugging command, setting, by a native debugger interface module of the meta-debugger, the breakpoint in a first native debugger, receiving, from a client, a service message invoking the first service, responsive to receiving the service message, triggering, by a debugger engine of the meta-debugger, the breakpoint, responsive to triggering the breakpoint, providing, by the user interface module, a first graphical representation of the first native debugger in the first language, receiving, by the user interface module, a second debugging command from the debugger client, converting, by the native debugger interface module, the second debugging command into a third debugging command that is compatible with the first native debugger, providing, by the native debugger interface module, the third debugging command to the first native debugger, invoking, by the first service, a second service including second code written in a second language, responsive to invoking the second service, providing, by the user interface module, a second graphical representation of the second native debugger in the second language, receiving, by the user interface module, a fourth debugging command from the debugger client, converting, by the native debugger interface module, the fourth debugging command into a fifth debugging command that is compatible with the second native debugger, and providing, by the native debugger interface module, the fifth debugging command to the second native debugger. In accordance with another example aspect of the present disclosure, which may be used in combination with any one or more of the preceding aspects, the first language is selected from the group consisting of: Java, C, C++, C-sharp, Visual Basic, SQL, Pascal, COBOL, BPEL, BPMN, CEP, jBPM, and Drools. In accordance with another example aspect of the present disclosure, which may be used in combination with any one or more of the preceding aspects, the second language is different from the first language and is selected from the group consisting of: Java, C, C++, C-sharp, Visual Basic, SQL, Pascal, COBOL, BPEL, BPMN, CEP, jBPM, and Drools. In accordance with another example aspect of the present disclosure, which may be used in combination with any one or more of the preceding aspects, the user interface module further provides to the debugger client a set of meta-debugger debugging commands including set a breakpoint, clear a breakpoint, step over, step into, step out, run, stop, get variable, get source, evaluate expression, and show stack frame information. In accordance with another example aspect of the present disclosure, which may be used in combination with any one or more of the preceding aspects, the meta-debugger further executes on the one or more processors to complete, by the meta-debugger, execution of the second service, responsive to completing the execution of the second service, return, by the meta-debugger, to the first service, and responsive to returning to the first service, provide, by the user interface module, the first graphical representation of the first native debugger in the first language. In accordance with another example aspect of the present disclosure, which may be used in combination with any one or more of the preceding aspects, the meta-debugger further executes on the one or more processors to invoke, by the first service, a third service including third code written in a third language, responsive to invoking the third service, provide, by the user interface module, a third graphical representation of a third native debugger in the third language, receive, by the user interface module, a sixth debugging command from the debugger client, convert, by the native debugger interface module, the sixth debugging command into a seventh debugging command that is compatible with the third native debugger, and provide, by the native debugger interface module, the seventh debugging command to the third native debugger. In accordance with another example aspect of the present disclosure, which may be used in combination with any one or more of the preceding aspects, the first and second services are service oriented architecture services.

In a third example aspect of the present disclosure, a computer-readable non-transitory storage medium storing executable instructions for debugging a first service including first code written in a first language and a second service including second code written in a second language, where the first language and the second language are different, which when executed by a computer system, cause the computer system to receive, by a user interface module of a meta-debugger executing on a computer system, a first debugging command from a debugger client to set a breakpoint in the first service including the first code written in the first language, responsive to receiving the first debugging command, set, by a native debugger interface module of the meta-debugger, the breakpoint in a first native debugger, receive, from a client, a service message invoking the first service, responsive to receiving the service message, trigger, by a debugger engine of the meta-debugger, the breakpoint, responsive to triggering the breakpoint, provide, by the user interface module, a first graphical representation of the first native debugger in the first language, receive, by the user interface module, a second debugging command from the debugger client, convert, by the native debugger interface module, the second debugging command into a third debugging command that is compatible with the first native debugger, provide, by the native debugger interface module, the third debugging command to the first native debugger, invoke, by the first service, the second service including the second code written in the second language, responsive to invoking the second service, provide, by the user interface module, a second graphical representation of the second native debugger in the second language, receive, by the user interface module, a fourth debugging command from the debugger client, convert, by the native debugger interface module, the fourth debugging command into a fifth debugging command that is compatible with the second native debugger, and provide, by the native debugger interface module, the fifth debugging command to the second native debugger. In accordance with another example aspect of the present disclosure, which may be used in combination with any one or more of the preceding aspects, the first language is selected from the group consisting of: Java, C, C++, C-sharp, Visual Basic, SQL, Pascal, COBOL, BPEL, BPMN, CEP, jBPM, and Drools. In accordance with another example aspect of the present disclosure, which may be used in combination with any one or more of the preceding aspects, the second language is different from the first language and is selected from the group consisting of: Java, C, C++, C-sharp, Visual Basic, SQL, Pascal, COBOL, BPEL, BPMN, CEP, jBPM, and Drools. In accordance with another example aspect of the present disclosure, which may be used in combination with any one or more of the preceding aspects, the user interface module further provides to the debugger client a set of meta-debugger debugging commands including set a breakpoint, clear a breakpoint, step over, step into, step out, run, stop, get variable, get source, evaluate expression, and show stack frame information. In accordance with another example aspect of the present disclosure, which may be used in combination with any one or more of the preceding aspects, the meta-debugger further executes on the one or more processors to complete, by the meta-debugger, execution of the second service, responsive to completing the execution of the second service, return, by the meta-debugger, to the first service, and responsive to returning to the first service, provide, by the user interface module, the first graphical representation of the first native debugger in the first language. In accordance with another example aspect of the present disclosure, which may be used in combination with any one or more of the preceding aspects, the meta-debugger further executes on the one or more processors to invoke, by the first service, a third service including third code written in a third language, responsive to invoking the third service, provide, by the user interface module, a third graphical representation of a third native debugger in the third language, receive, by the user interface module, a sixth debugging command from the debugger client, convert, by the native debugger interface module, the sixth debugging command into a seventh debugging command that is compatible with the third native debugger, and provide, by the native debugger interface module, the seventh debugging command to the third native debugger. In accordance with another example aspect of the present disclosure, which may be used in combination with any one or more of the preceding aspects, the first and second services are service oriented architecture services.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system for debugging a first service including first code written in a first language and a second service including second code written in a second language, where the first language and the second language are different, comprising:
   a memory;
   one or more processors, in communication with the memory;
   a client executing on the one or more processors; and
   a meta-debugger including:
   an interface;
   a native debugger interface;
   a debugger engine;
   a first native debugger; and
   a second native debugger;
   wherein the meta-debugger executes on the one or more processors to:
   trigger a breakpoint in the first service;
   convert, by the native debugger interface, a first debugging command received by the interface into a second debugging command that is compatible with the first native debugger;
   provide, by the native debugger interface, the second debugging command to the first native debugger;
   invoke, by the first service, the second service including the second code written in the second language;
   responsive to invoking the second service, provide by the interface, a first representation of the second native debugger in the second language;
   convert, by the native debugger interface, a third debugging command received by the interface into a fourth debugging command that is compatible with the second native debugger; and
   provide, by the native debugger interface, the fourth debugging command to the second native debugger.

2. The system of claim 1, wherein the first language is selected from the group consisting of: Java, C, C++, C-sharp, Visual Basic, SQL, Pascal, COBOL, BPEL, BPMN, CEP, jBPM, and Drools.

3. The system of claim 2, wherein the second language is different from the first language and is selected from the group consisting of: Java, C, C++, C-sharp, Visual Basic, SQL, Pascal, COBOL, BPEL, BPMN, CEP, jBPM, and Drools.

4. The system of claim 1, wherein the interface further provides to a debugger client a set of meta-debugger debugging commands including set a breakpoint, clear a breakpoint, step over, step into, step out, run, stop, get variable, get source, evaluate expression, and show stack frame information.

5. The system of claim 1, wherein the meta-debugger further executes on the one or more processors to:
   complete, by the meta-debugger, execution of the second service;
   responsive to completing execution of the second service, return, by the meta-debugger, to the first service; and
   responsive to returning to the first service, provide, by the interface, a second representation of the first native debugger in the first language.

6. The system of claim 1, wherein the meta-debugger further executes on the one or more processors to:
   invoke, by the first service, a third service including third code written in a third language;
   responsive to invoking the third service, provide, by the interface, a second representation of a third native debugger in the third language;
   receive, by the interface, a fifth debugging command from the debugger client;
   convert, by the native debugger interface, the fifth debugging command into a sixth debugging command that is compatible with the third native debugger; and
   provide, by the native debugger interface, the sixth debugging command to the third native debugger.

7. The system of claim 1, wherein the first and second services are service oriented architecture services.

8. A method for debugging a first service including first code written in a first language and a second service including second code written in a second language, where the first language and the second language are different, comprising:
   triggering, by an interface of a meta-debugger executing on a computer system, a breakpoint in the first service;
   converting, by a native debugger interface of the meta-debugger, a first debugging command received by the interface into a second debugging command that is compatible with a first native debugger;
   providing, by the native debugger interface, the second debugging command to the first native debugger;
   invoking, by the first service, the second service including the second code written in the second language;
   responsive to invoking the second service, providing by the interface, a first representation of a second native debugger in the second language;
   converting, by the native debugger interface, a third debugging command received by the interface into a fourth debugging command that is compatible with the second native debugger; and
   providing, by the native debugger interface, the fourth debugging command to the second native debugger.

9. The method of claim 8, wherein the first language is selected from the group consisting of: Java, C, C++, C-sharp, Visual Basic, SQL, Pascal, COBOL, BPEL, BPMN, CEP, jBPM, and Drools.

10. The method of claim 9, wherein the second language is different from the first language and is selected from the group consisting of: Java, C, C++, C-sharp, Visual Basic, SQL, Pascal, COBOL, BPEL, BPMN, CEP, jBPM, and Drools.

11. The method of claim 8, further comprising:
    providing, by the interface to a debugger client a set of meta-debugger debugging commands including set a breakpoint, clear a breakpoint, step over, step into, step out, run, stop, get variable, get source, evaluate expression, and show stack frame information.

12. The method of claim 8, further comprising:
    completing, by the meta-debugger, execution of the second service;
    responsive to completing execution of the second service, returning, by the meta-debugger, to the first service; and
    responsive to returning to the first service, providing, by the interface, a second representation of the first native debugger in the first language.

13. The method of claim 8, further comprising:
    invoking, by the first service, a third service including third code written in a third language;
    responsive to invoking the third service, providing, by the interface, a second representation of a third native debugger in the third language;
    receiving, by the interface, a fifth debugging command from the debugger client;
    converting, by the native debugger interface, the fifth debugging command into a sixth debugging command that is compatible with the third native debugger; and providing, by the native debugger interface, the sixth debugging command to the third native debugger.

14. The method of claim 8, wherein the first and second services are service oriented architecture services.

15. A computer-readable non-transitory storage medium storing executable instructions for debugging a first service including first code written in a first language and a second service including second code written in a second language, where the first language and the second language are different, which when executed by a computer system, cause the computer system to:
   trigger, by an interface of a meta-debugger executing on a computer system, a breakpoint in the first service;
   convert, by a native debugger interface of the meta-debugger, a first debugging command received by the interface into a second debugging command that is compatible with a first native debugger;
   provide, by the native debugger interface, the second debugging command to the first native debugger;
   invoke, by the first service, the second service including the second code written in the second language;
   responsive to invoking the second service, provide by the interface, a first representation of a second native debugger in the second language;
   convert, by the native debugger interface, a third debugging command received by the interface into a fourth debugging command that is compatible with the second native debugger; and
   provide, by the native debugger interface, the fourth debugging command to the second native debugger.

16. The computer-readable non-transitory storage medium of claim 15, wherein the first language is selected from the group consisting of: Java, C, C++, C-sharp, Visual Basic, SQL, Pascal, COBOL, BPEL, BPMN, CEP, jBPM, and Drools.

17. The computer-readable non-transitory storage medium of claim 16, wherein the second language is different from the first language and is selected from the group consisting of: Java, C, C++, C-sharp, Visual Basic, SQL, Pascal, COBOL, BPEL, BPMN, CEP, jBPM, and Drools.

18. The computer-readable non-transitory storage medium of claim 15, wherein the executable instructions, when executed by the computer system, further cause the computer system to provide, by the interface to a debugger client a set of meta-debugger debugging commands including set a breakpoint, clear a breakpoint, step over, step into, step out, run, stop, get variable, get source, evaluate expression, and show stack frame information.

19. The computer-readable non-transitory storage medium of claim 15, wherein the executable instructions, when executed by the computer system, further cause the computer system to:
   complete, by the meta-debugger, execution of the second service;
   responsive to completing execution of the second service, return, by the meta-debugger, to the first service; and
   responsive to returning to the first service, provide, by the interface, a second graphical representation of the first native debugger in the first language.

20. The computer-readable non-transitory storage medium of claim 15, wherein the executable instructions, when executed by the computer system, further cause the computer system to:
   invoke, by the first service, a third service including third code written in a third language;
   responsive to invoking the third service, provide, by the interface, a second representation of a third native debugger in the third language;
   receive, by the interface, a fifth debugging command from the debugger client;
   convert, by the native debugger interface, the fifth debugging command into a sixth debugging command that is compatible with the third native debugger; and
   provide, by the native debugger interface, the sixth debugging command to the third native debugger.

* * * * *

UNITED STATES PATENT AND TRADEMARK OFFICE
CERTIFICATE OF CORRECTION

PATENT NO. : 10,185,644 B2  
APPLICATION NO. : 15/403521  
DATED : January 22, 2019  
INVENTOR(S) : Pechanec et al.

Page 1 of 1

It is certified that error appears in the above-identified patent and that said Letters Patent is hereby corrected as shown below:

In the Claims

In Column 16, Line 43 (Claim 11), after "client" insert --,--;

In Column 18, Line 7 (Claim 18), after "client" insert --,--;

In Column 18, Line 20 (Claim 19), after "second" delete "graphical".

Signed and Sealed this  
Twenty-sixth Day of March, 2019

Andrei Iancu  
*Director of the United States Patent and Trademark Office*